United States Patent [19]

Matsuyoshi et al.

[11] Patent Number: 4,615,931

[45] Date of Patent: Oct. 7, 1986

[54] SHAPED GLASS PANEL FOR AUTOMOBILE REAR WINDOW OR REAR DOOR

[75] Inventors: Yukio Matsuyoshi; Masao Tsukagoshi, both of Matsusaka, Japan

[73] Assignee: Central Glass Company, Limited, Ube, Japan

[21] Appl. No.: 700,131

[22] Filed: Feb. 11, 1985

[30] Foreign Application Priority Data

Feb. 22, 1984 [JP] Japan .............................. 59-22972[U]
Feb. 22, 1984 [JP] Japan .................................. 59-30306
Feb. 23, 1984 [JP] Japan .................................. 59-31404

[51] Int. Cl.⁴ ....................... B32B 1/00; C03B 23/023
[52] U.S. Cl. ..................................... 428/174; 65/106; 65/273; 65/287
[58] Field of Search ................. 65/106, 107, 273, 287; 428/174

[56] References Cited

U.S. PATENT DOCUMENTS 4,305,746 12/1981 Hagedorn et al. ..................... 65/106
4,488,892 12/1984 Frank et al. ............................ 65/106
4,501,603 2/1985 Frank et al. ............................ 65/106

*Primary Examiner*—Arthur Kellogg
*Attorney, Agent, or Firm*—Schwartz, Jeffery, Schwaab, Mack, Blumenthal & Evans

[57] ABSTRACT

Disclosed is a shaped glass panel for use as a rear window or an all-glass rear door of an automobile. The glass panel has an upwardly projecting rear spoiler portion which is inseparably contiguous to the main portion of the panel and is formed by bending the glass panel in its bottom edge portion along a line parallel to the bottom edge of the panel. The main portion of the glass panel may include two generally downwardly projecting side edge regions. In such a case, press bending of a preheated glass sheet into the shaped panel is performed in two stages such that bending of the glass sheet in its bottom edge portion to form the spoiler portion and bending of the same glass sheet in its side edge portions are done sequentially. Preferably the preheating is performed so as to produce such a temperature gradient in the glass sheet that the glass temperature in the bottom portion becomes higher than in the top edge portion by 30°–50° C.

4 Claims, 12 Drawing Figures

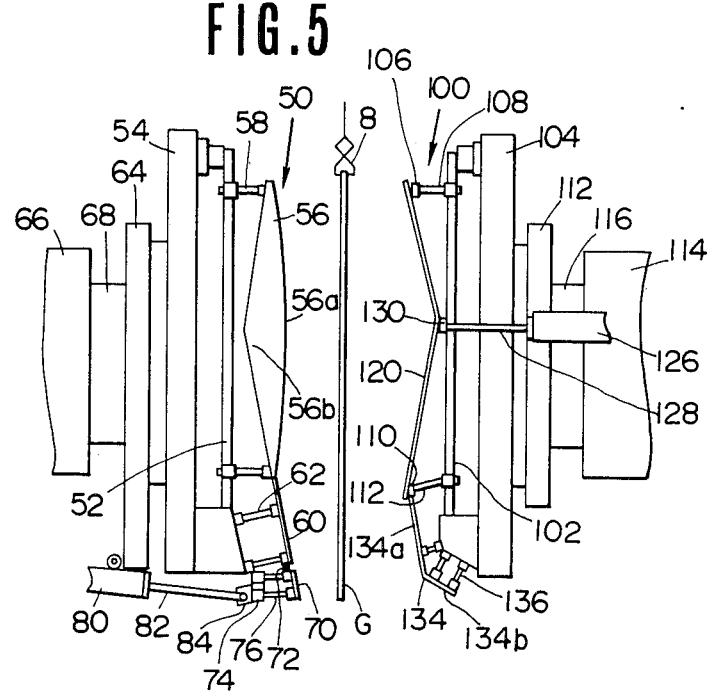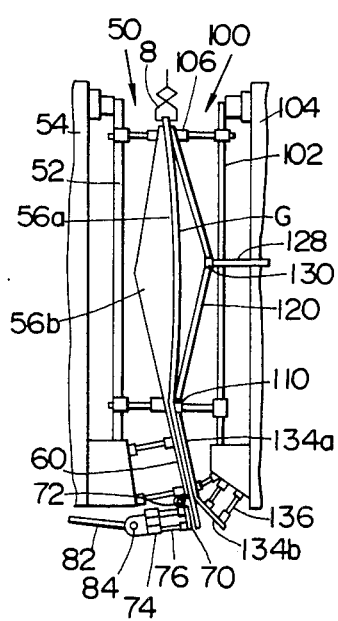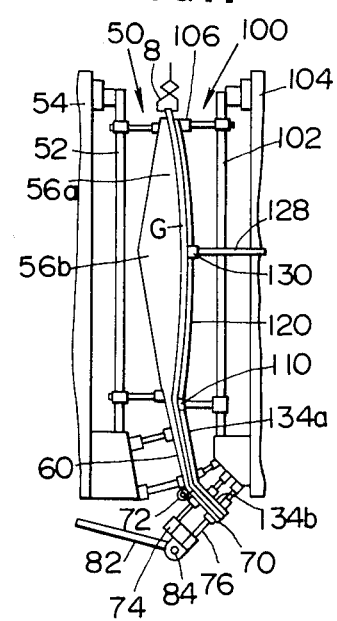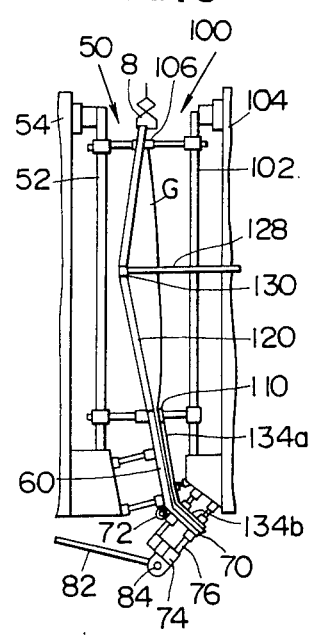

SHAPED GLASS PANEL FOR AUTOMOBILE REAR WINDOW OR REAR DOOR

BACKGROUND OF THE INVENTION

This invention relates to a glass panel which is so shaped as to serve as a rear window or a rear door of an automobile and has an upwardly projecting spoiler portion formed by bending a bottom edge portion of the glass panel along a transverse line.

In recent automobiles, modernization of the body design is a matter of continuing concern particularly with a view to decreasing the aerodynamic drag thereby improving the performance and fuel economy and also to exciting the consumers' interest. Recent trends include the employment of slippery body shapes, enlargement of the window areas and reduction in projecting and depressed areas of the body outer surfaces so as to realize so-called flush surfaces. Also it has become popular to provide a transverse ridge-like spoiler on the rear hood or deck at the rear end of the car body for the purpose of decreasing lift during high-speed running of the car and thereby maintaining road-holding stability of the running car.

The rear spoiler is formed of a metal sheet or a synthetic resin usually as a separate part and is attached to a body panel by suitable joining means. Therefore, the production cost of the rear spoiler including the labor cost for attachment becomes considerable, and the provision of the rear spoiler is usually contradictory to the desire for reduction in the gross weight of the car body. Furthermore, the joints between the spoiler and the supporting panel are not always easy to render even and smooth. Besides, sometimes the attachment of a rear spoiler to a hatchback car imposes restrictions on the design of the lift-up rear door.

SUMMARY OF THE INVENTION

It is an object of the present invention to provide a shaped glass panel which serves as a rear window or an all-glass rear door of an automobile and has an inseparably formed spoiler portion to thereby obviate most of the above described disadvantages of the conventional rear spoilers on automobiles.

The present invention provides a glass panel for use as a rear window or a rear door of an automobile, which comprises a main portion so shaped as to close a rear view or rear access opening of an automobile body and an upwardly projecting rear spoiler portion which is inseparably contiguous to the main portion and which is formed by bending the glass panel along a transverse line parallel to and at a relatively short distance from a bottom edge of the glass panel.

A glass panel according to the invention is characterized by unitarily including the aforementioned projecting spoiler portion, while the main portion of the glass panel does not particularly differ from conventional rear windows or all-glass rear doors of automobiles. The main portion of this glass panel may be, for example, nearly flat, generally and shallowly curved, or partly flat and partly shallowly curved, or may be bent through a large angle in its both side regions such that the resultant side edge regions become portions of the side upper surfaces of the car body.

In the simplest form, the projecting spoiler portion is given by simply bending the glass panel in the manner as stated above. It is also within the scope of the invention to further bend the spoiler portion of the simplest form in the direction inverse to the initial bending along another bend line drawn between the initial bend line and the bottom edge of the glass panel, i.e. free edge of the initially formed spoiler portion, to thereby form a ridge-like spoiler portion.

Thus, a rear spoiler is provided to an automobile body by simply fitting the body with a rear window glass or an all-glass rear door according to the invention. There is no need for the joining means and work that are indispensable for the conventional rear spoilers. Consequently the provision of the rear spoiler can be accomplished at reduced cost and with less increase in the car body weight. Furthermore, in the glass panel of the invention a border area between the spoiler portion and the window or door panel portion has a smooth surface, so that an increase in the drag coefficient by the provision of the rear spoiler is minimized. Another important merit of the invention resides in that the rear spoiler is unique in the fashion and very attractive in appearance. On the other hand, the rear spoiler according to the invention does not differ in its lift decreasing effect from the conventional rear spoilers formed of a metal or plastics.

A glass panel of the invention is produced by press shaping or press bending of a glass sheet preheated near to the softening temperature of the glass. Where the main portion of the glass panel has a relatively simple shape there is no particular problem in the press shaping method. However, where the main portion is bent through a large angle in its side edge regions, difficulties arise in bending a glass sheet into a desirably shaped panel without producing cracks or optical distortions. To overcome such difficulties, we propose to sequentially perform the bending to form the spoiler portion and the deep bending in the side edge regions at a press bending station equipped with segmented shaping plates. In such a case it is preferred to perform preheating of the flat sheet so as to produce a temperature gradient in the glass sheet from its top edge to its bottom edge.

BRIEF DESCRIPTION OF THE DRAWINGS

FIG. 5 is a side elevation of a principal part of a press bending apparatus for forming the glass panel of FIG. 1;

FIGS. 6 to 8 show the sequential operations of the apparatus of FIG. 5 in a process of shaping a flat glass sheet into the panel of FIG. 1;

DESCRIPTION OF THE PREFERRED EMBODIMENTS

Figure 1:
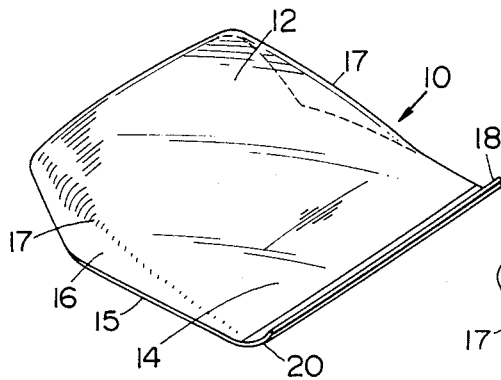
FIG. 1 is a perspective view of a glass panel according to the invention designed for use as an all-glass lift-up rear door of an automobile.
Figure 2:
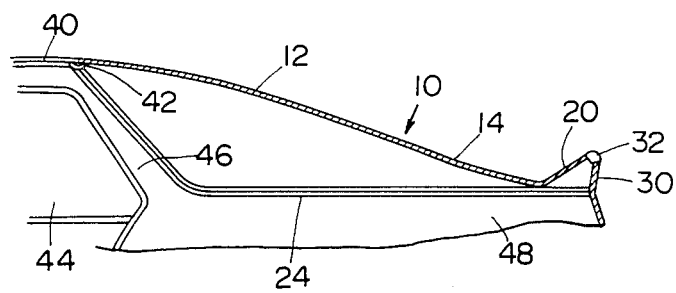
FIG. 2 is a partly sectional side elevation of an upper portion of an automobile rear body fitted with the glass rear door of FIG. 1.

As an embodiment of the invention, FIG. 1 shows a glass panel 10 shaped so as to serve as an all-glass rear door of an automobile. As shown in FIG. 2, this glass panel 10 is used as a lift-up rear door which is swingably attached at its top edge region to a roof panel 40 of the car by conventional hinges 42. Indicated at 44 is a side window of the car and at 46 a rear quarter pillar.

A rear window portion of the glass door 10 consists of a major and relatively upper area 12 where the glass sheet is shallowly curved and a lower area 14 where the glass sheet is nearly flat. Both side edges 15 of the glass door 10 are obtusely angled, and the glass sheet is bent through a relatively large angle and with a relatively large curvature along an imaginary longitudinal line shortly distant from each side edge 15. As the result, the glass door 10 has two curved side portions 16 which become portions of side surfaces of the car body. Each of these side portions 16 merges into the broader areas 12 and 14 at a roundish shoulder 17 which extends generally longitudinally of the panel 10. Along the bottom end of the nearly flat area 14, the glass sheet is bent upward such that a narrow area 20 between a bottom edge 18 of the glass sheet and the nearly flat area 14 becomes an upwardly projecting rear spoiler portion, which may be slightly curved as illustrated. This rear spoiler portion 20 is formed for the purpose of decreasing the lift acting on the rear body of the running car and maintaining good road-holding of the rear wheels. Therefore, the angle and height of the rear spoiler portion 20 are determined upon proper consideration of the general shape of the rear body of the car in the same manner as in designing conventional rear spoilers for automobiles.

Of course the illustrated shape of the glass door 10 is not limitative. For example, for use in most of the current hatchback cars the glass door needs not to be formed with the deeply bent side areas 16.

For installation of the glass door 10 on an automobile as shown in FIG. 2, conventional weatherstrips 24 or the like are attached to the top and side edges of the glass door 10. At the bottom edge 18 or upper edge of the rear spoiler portion 20, a rear support element 30 may be attached to the glass door 10 by using a suitable joint means 32 such that the lower end of the support element 30 rests on the rear ends of the rear quarter panels 48 of the car body when the door 10 is in the closed position.

Figure 3:
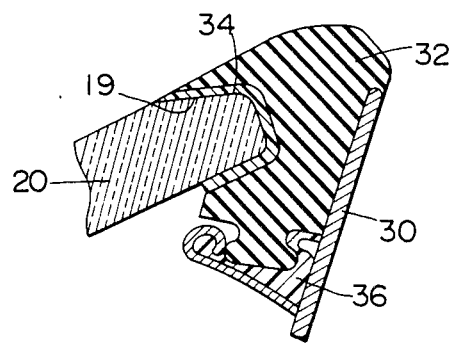
FIG. 3 is a vertical sectional view of a rear edge support element attached to the rear spoiler portion of the glass panel of FIG. 1.

FIG. 3 shows an example of the support element 30 and joint means 32 in FIG. 2. At the upper edge 18 of the rear spoiler portion 20 the glass sheet is chamfered so as to provide a tapered surface 19 on the upper side. The support element 30 has an elongate trough-like structure formed of a sheet metal or a synthetic resin. The joint means 32 is an elongate block of a hard or semi-hard rubber or a metal and is formed with a groove to receive therein the edge part of the rear spoiler portion 20. This block 32 has an upper surface shaped so as to become nearly flush with the upper surface of the spoiler portion 20 of the glass door 10. The joining block 32 is fixed to the support element 30 by using, for example, an adhesive 36 and/or a combination of a projection on the bottom face of the block 32 and a slot in the support element 30. The joining block 32 is fixed to the glass door 10 with an adhesive 34 along the edge 18 of the rear spoiler portion 20.

Figure 4:
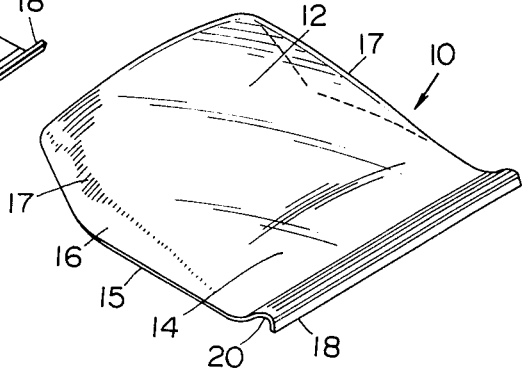
FIG. 4 is a perspective view of another glass panel according to the invention, which is generally similar to the glass panel of FIG. 1 but is modified in the shape of the rear spoiler portion.

FIG. 4 shows a modification of the glass door 10 of FIG. 1 in the shape of the rear spoiler portion 20. In this embodiment, the spoiler portion 20 is formed by twice bending the glass sheet. First, the glass sheet is bent in the same manner as in the case of FIG. 1 though the line of bending is more distant from the bottom edge 18 than in the case of FIG. 1. Next, the upwardly projecting portion formed by the first bending is bent inversely in its middle region such that the edge 18 faces downward and reaches nearly the same level as the line of the first bending. As the result, the rear spoiler portion 20 of the glass door 10 of FIG. 2 has a ridge-like shape. This glass door 10 needs not to be provided with the support element 30 and joint means 32 shown in FIG. 2 or an alternative.

Since the rear spoiler portion 20 of a glass panel according to the invention is formed with transparent glass, this portion 20 can be utilized for various auxiliary purposes with no influence on the effect of this portion 20 as a rear spoiler. For example, it is possible to indicate some characters or symbols on the inner surface of the spoiler portion 20 shown in FIG. 4, or to attach some lamps on the same inner surface. In such a case it is recommended to apply an antireflective coating to the outer surface of at least the spoiler portion 20 of the glass panel 10. Antireflective coating on the main portion of the glass panel 10 is favorable for the prevention of reflection of the projecting spoiler portion 20 in the window areas of the panel 10. It is also possible to attach solar cells to the inner surface of the glass panel 10 in areas not obstructive to the fields of vision of the driver and passengers, e.g. in the nearly flat area 14 of the glass panel 10 of FIG. 4.

A glass panel according to the invention can be produced by press bending of a flat glass sheet of a suitable shape, which is preheated near to the softening temperature of the glass. When the glass panel consists of a nearly flat or only shallowly curved main portion and a rear spoiler portion, the press bending can be accomplished by a well known technique without encountering difficulties. However, a new idea is required for producing a more complicatedly curved and bent glass panel according to the invention, such as the one shown in FIG. 1 or FIG. 4 wherein the glass sheet must be bent in different directions through relatively large angles. We have found that such a complicatedly shaped glass panel can be obtained with high precision and with little probability of producing cracks or optical distortions by first performing only the bending to form the rear spoiler portion and subsequently accomplishing the bending and curving to form the main portion of the glass panel 10 including the deeply bent side portions 16, or by performing such two-stage bending in the reverse sequence. The following is a description of the new press bending method and apparatus with reference to FIGS. 5-9.

FIG. 5 shows a press bending apparatus consisting of a pair of opposing presses 50 and 100. A flat glass sheet G of a suitable shape, which is preheated, for example, to about 720° C. in a separate furnace (not shown), is in position between the two presses 50 and 100 in a state suspended by tongs 8 which are in turn hung from an unillustrated carriage transfered along a conveyor.

In the first press 50, a support plate 52 is fixedly mounted on a base plate 54, and a convexly curved shaping plate 56 having a slightly curved central portion 56a and two deeply bent side portions 56b is fixedly connected to the support plate 52 by support rods 58.

United with, and as a downward extension of the shaping plate 56, a nearly flat shaping plate 60 is held on the support plate 52 by adjustable support rods 62. The press 50 has a main pneumatic cylinder 66 with its piston rod 68 connected to the base plate 54 via a back plate 64. Furthermore, below the shaping plate 60 there is a strip-like shaping plate 70 corresponding to the shape of the intended rear spoiler. On the back side, an upper edge portion of this shaping plate 70 is coupled with a bottom edge portion of the shaping plate 60 by coupling means 72 which allow the lower shaping plate 70 to make a swing movement relative to the upper shaping plate 60. By support rods 76 the shaping plate 70 is held on a support plate 74. A pneumatic cylinder 80 is movably supported by the base plate 64, and the protruding end of its piston rod 82 is eccentrically linked to the support plate 74 by coupling means 84.

Figure 9:
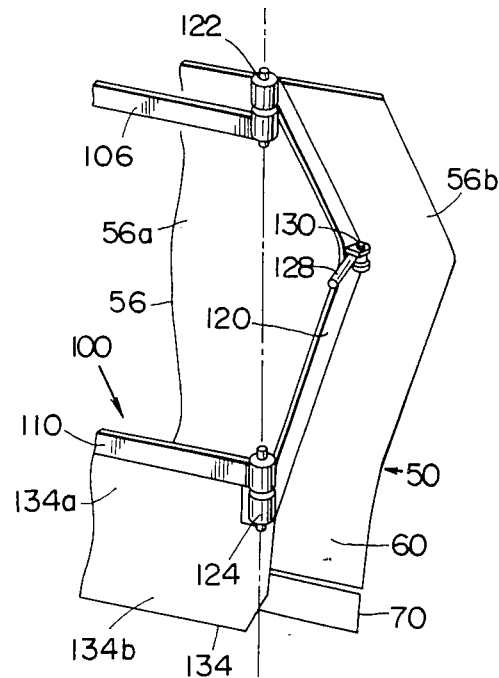
FIG. 9 is a perspective view of a part of the apparatus of FIG. 5.

The second press 100 has a main pneumatic cylinder 114 with its piston rod 116 connected to a base plate 104 via a back plate 112. A support plate 102 is fixedly mounted on the base plate 104. As shown in FIGS. 5 and 9, an upper shaping plate 106 in the form of a slightly concavely curved bar is held horizontally on the support plate 102 by support rods 108 at the same level as the uppermost region of the main shaping plate 56 in the opposite press 50. Similarly, a lower shaping plate 110 in the form of a slightly concavely curved bar is held horizontally by support rods 112 at the same level as the lowermost region of the shaping plate 56 in the opposite press 50. For each of the two deeply bent side portions 56b of the shaping plate 56 in the first press 50, the second press 100 has an angled bar 120 which is pivotally coupled with the upper and lower shaping plates 106, 110 by coupling means 122 and 124 so as to be turned about a vertical axis that extends along the side edges of the upper and lower shaping plates 106, 110. For each angled bar 120, there is a pneumatic cylinder 126 which is held by the back plate 112 with its piston rod 128 coupled with the bend part of the angled bar 120 by a coupling means 130. Below the lower bar-like shaping plate 110, another shaping plate 134 is held on the support plate 102 by support rods 136 such that an upper edge of this shaping plate 134 is in contact with the lower edge of the bar-like shaping plate 110. The shaping plate 134 is bent along a horizontal line so as to provide an upper first area 134a, which is opposite to and complementary of the shaping plate 60 in the first press 50 for shaping the nearly flat region 14 of the glass panel 10 to be produced, and a lower second area 134b for shaping the rear spoiler portion 120 of the glass panel 10.

Using the apparatus of FIG. 5, the two-stage press bending operation for producing the shaped glass panel 10 of FIG. 1 is performed in the following sequence, as illustrated in FIGS. 6–8.

First, the main pneumatic cylinders 66 and 114 of the respective presses 50 and 100 are operated to advance the base plates 54 and 104 of the respective presses toward the suitably prehated glass sheet G to such an extent, as shown in FIG. 6, that the glass sheet G is locally pressed between the nearly flat shaping plate 60 of the first press 50 and the complementary first area 134a of the shaping member 134 of the second press 100 and that the slightly curved surface 56a of the convexly curved shaping plate 56 of the first press 50 is pressed against the glass sheet G. At this stage the angled bars 120 in the second press 100 are kept distant from the glass sheet G. Then, the pneumatic cylinder 80 in the first press 50 is actuated to turn the lower shaping plate 70 anticlockwise to thereby bend the lower edge portion of the glass sheet G, as shown in FIG. 7, until it is pressed between the shaping plate 70 and the lower area 134b of the shaping plate 134 of the second press 100. By this bending operation the forming of the rear spoiler portion 20 of the intended glass panel 10 is accomplished.

Keeping the shaping plates of the first press 50 in the positions shown in FIG. 7, the pneumatic cylinders 126 of the second press 100 are actuated to push the coupling means 130 attached to each of the two angled bars 120 to thereby turn the angled bars 120 toward the glass sheet G. Referring to FIG. 8, each angled bar 120 comes into contact with the glass sheet G and forces it to bend until its each side edge portion is pressed against the surface of the deeply bent side portion 56b of the shaping plate 56 of the first press 50. By this operation the forming of the side edge portions 16 of the glass panel 10 is accomplished. After that the piston rod of every pneumatic cylinder in the press bending apparatus is retracted, and the shaped glass sheet or glass panel 10 is carried out of the apparatus by means of the aforementioned conveyor.

The sequence of the bending operations is not limited to the one described above. Depending on the general shape of the glass panel to be produced, it is also possible to first accomplish bending of side edge portions of the glass sheet and subsequently form the rear spoiler portion of the glass panel. In general it is recommended to first bend the glass sheet in a region, or regions, where the desired curvature is relatively smaller.

To obtain a defectless product, it is preferable to perform the preheating of the glass sheet G to be shaped into a glass panel having deeply bent side edge portions besides a rear spoiler portion so as to produce a temperature gradient in the vertical direction in the heated glass sheet such that the bottom edge portion of the glass sheet acquires the highest temperature.

Figure 10:
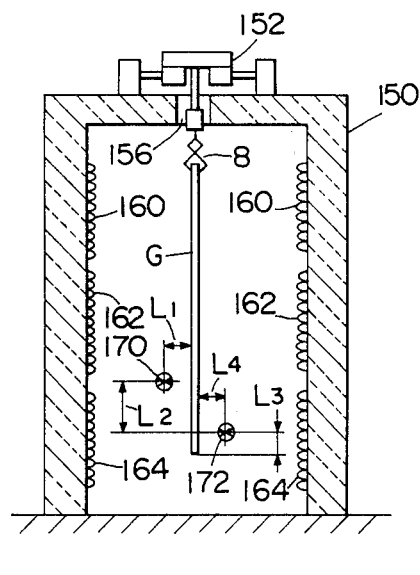
FIG. 10 is a sectional elevation of a furnace suitable for use in preheating a glass sheet to be shaped into a glass panel according to the invention.

FIG. 10 shows a furnace 150 suitable for use in preheating the glass sheet G in such a manner. Using a slot-like opening 156 in the top wall of the furnace, the glass sheet G suspended by tongs 8 can be carried into a central section of the furnace by means of a trolley conveyor 152. On the inner surfaces of two opposite side walls of the furnace 150, there are three sets of electric heater elements 160, 162, 164 which are located at three different levels, respectively, and each of which is arranged so as to heat the glass sheet G from both sides. In addition, a rod-like heating element 170 extends horizontally at a short distance from and parallel to the glass sheet G, and another rod-like heating element 172 extends horizontally on the opposite side of the glass sheet G at a short distance from and parallel to the glass sheet G. The level of the secondly mentioned rod-like heating element 172 is only slightly above the bottom edge of the glass sheet G, whereas the other rod-like heating element 170 is at a higher level near the gap between the middle and lower heater elements 162 and 164 on the side walls. For example, the glass sheet G to be shaped into the glass panel 10 of FIG. 1 is 4 mm thick, about 1300 mm wide and about 1200 mm long. In this case the horizontal distances of the rod-like heating elements 170 and 172 from the glass sheet G, i.e. $L_1$ and $L_4$ in FIG. 10, are about 100 mm and about 40 mm, respectively; the vertical distance $L_2$ between the two heating elements 170 and 172 is about 250 mm; and the vertical distance $L_3$ between the heating element 172 and the bottom edge of the glass sheet is about 100 mm. Conveniently, the rod-like heating elements 170 and 172 are held movably to allow adjustment of these distances within the following ranges, for example: $L_1$ is 50–150 mm; $L_2$ is 150–350 mm; $L_3$ is 0–200 mm; $L_4$ is 20–100 mm.

Before introducing the glass sheet G into the furnace 150, the main heating elements 160, 162, 164 are energized under different loads such that the upper heating element 160 generates the smallest amount of heat and the lower heating element 164 the largest amount of heat. For example, assuming that the softening temperature of the glass sheet G is about 710° C. and that the furnace 150 is 600 mm×2500 mm wide and 2000 mm high on the inside, loads of about 50 kW, about 60 kW and about 70 kW are applied to the upper, middle and lower heating elements 160, 162 and 164, respectively. By doing so, it is possible to maintain the temperature in the furnace at about 705° C. in an uppermost section, at about 715° C. in a middle section and at about 735° C. in a lowermost section. The rod-like heating elements 170 and 172 are left deenergized.

In this state the glass sheet G is carried into the furnace 150. Then the temperatures in the furnace become somewhat lower, but the aforementioned temperatures are resumed in about 30 seconds. After that a load of about 4 kW is applied to each of the two rod-like heating elements 170 and 172 to locally intensify the heating of the glass sheet G. In about 60 seconds the temperature in the furnace becomes again stable at about 705° C. in the uppermost section, at about 720° C. in the middle sectin and at about 745° C. in the lowermost section. Then the rod-like heating elements 170, 172 are deenergized, and immediately the heated glass sheet G is transferred from the furnace 150 to the press bending apparatus described hereinbefore. We have confirmed that by preheating the glass sheet in this manner industrial production of glass panels of the shape shown in FIG. 1 or FIG. 4 can surely and stably be achieved with fully satisfactory quality of the products. In the furnace of FIG. 10, it is also possible to obtain good results by initially operating the main heating elements 160, 162, 164 so as to nearly uniformly heat the entire space in the furnace and then operating the rod-like heating elements 170, 172 so as to produce such a temperature gradient that the temperature becomes higher in the lowermost section by 30°–50° C. than in the uppermost section.

Figure 11:
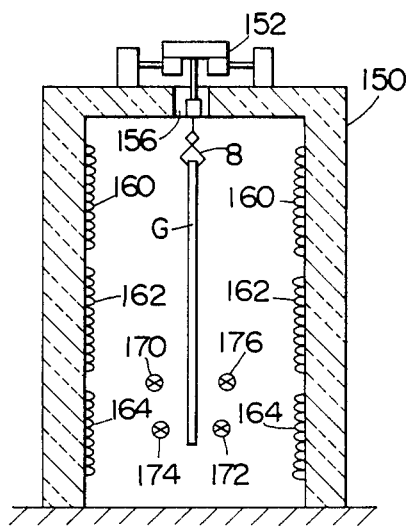
FIGS. 11 and 12 show two different modifications of the arrangement of heating elements in the furnace of FIG. 10, respectively.

Referring to FIG. 11, the furnace 150 of FIG. 10. may be provided with two additional rod-like heating elements 174 and 176 which are arranged symmetrical with the already described rod-like heating elements 172 and 170, respectively, with respect to the glass sheet G. The additional heating elements 174, 176 may be used by application of smaller loads than the heating elements 170 and 172.

It is undesirable to arrange every rod-like heating element for local intensification of the heating at the same level. In an experiment using the furnace of FIG. 11, preheating of the glass sheet G was performed generally as described hereinbefore with reference to FIG. 10 except that the local intensification of the heating was done by using the two rod-like heating elements 172 and 174 located at the same level. The remaining two heating elements 170 and 176 were never energized. As the result, the glass sheet G was heated to about 725° C. in its bottom edge portion and to about 710° C. in the remaining portions The heated glass sheet was shaped into the glass panel 10 of FIG. 1 by using the press bending apparatus of FIG. 5. It was possible to form the rear spoiler portion 20 without problem, but deep bending of the side edge portions was only poorly accomplished particularly in regions where sidewise bending, upward bending and upwardly convexly warping of the glass sheet merged into each other, and tiny cracks appeared in the shaped glass panel.

Figure 12:
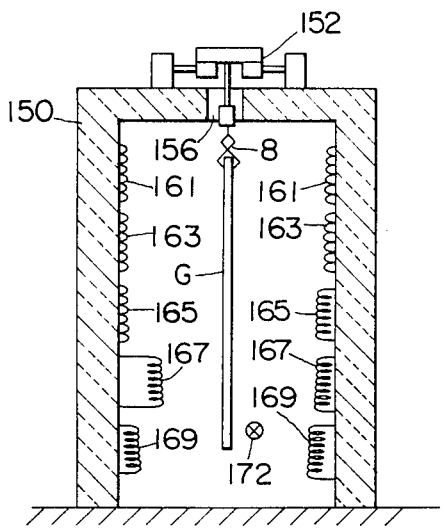

FIG. 12 shows another modification of the furnace 150. This furnace has five sets of heating elements 161, 163, 165, 167, 169 on the side walls, and the horizontal distances of the respective heating elements from the glass sheet G are slightly and orderly different such that the lowermost heating element 169 is the least distant from the glass sheet. Furthermore, the heating element 167 second to the lowest is distinctly projecting toward the glass sheet G only in a part on one side of the glass sheet. On the opposite side of the glass sheet, there is a rod-like heating element 172 arranged similarly to the heating element 172 in FIG. 10 at short horizontal and vertical distances from the bottom edge of the glass sheet. In this furnace the projecting part of the heating element 167 serves the same local heating purpose as the rod-like heating element 170 in the furnace of FIG. 10.

Irrespective of the design of the preheating furnace, it is preferable to produce such a temperature gradient in the heated glass sheet G that the temperature becomes near to the softening temperature of the glass in a relatively upper region distant from the top edge by about a third of the vertical length of the suspended glass sheet, and that the glass temperature in the bottom edge portion becomes higher than in the top edge portion by at least 30° C. and not more than 50° C. It is undesirable to heat the top edge portion of the suspended glass sheet to above the softening temperature because then significant traces of the tongs 8 will remain on the shaped product. When the temperature difference between the bottom edge portion and the top edge portion of the glass sheet is smaller than 30° C., it becomes difficult to shape the bottom edge portion of the glass sheet into a defectless rear spoiler portion of the intended glass panel. On the other hand, when the temperature difference is greater than 50° C. there arise possibilities of deformation of the glass panel after completion of a press bending process and/or appearance of undesirable traces of the shaping plates on the surfaces of the shaped glass panel.

What is claimed is:
1. A glass panel for use as a rear window or rear door of an automobile, said glass panel comprising
  (i) a main portion so shaped as to close a rear opening of an automobile body, and
  (ii) an upwardly projecting rear spoiler portion which is inseparably contiguous to said main portion and which is formed by bending the glass panel along a laterally transverse first line parallel to and at a relatively short distance from a bottom edge of the glass panel, wherein said glass panel is further bent in said spoiler portion along a second line parallel to the bottom edge of the glass panel inversely to the bending along said first line such that said spoiler portion has a ridge-like shape and that said bottom edge becomes a rear and lower edge of said spoiler portion.

2. A glass panel for use as a rear window or a rear door of an automobile, said glass panel comprising
  (i) a main portion so shaped as to close a rear opening of an automobile body, and (ii) an upwardly projecting rear spoiler portion which is inseparably contiguous to said main portion and which is formed by bending the glass panel along a laterally transverse line parallel to and at a relatively short distance from a bottom edge of the glass panel, wherein said spoiler portion is formed such that the bottom edge of the glass panel becomes a rear and upper edge of said spoiler portion.

3. A glass panel according to claim 1, wherein said main portion has two generally downwardly projecting side regions each of which merges into the remaining region of said main portion at a roundish shoulder which extends generally longitudinally of the glass panel.

4. A glass panel according to claim 2, wherein said main portion has two generally downwardly projecting said regions each of which merges into the remaining region of said main portion at a roundish shoulder which extends generally longitudinally of the glass panel.

* * * * *